United States Patent [19]

Osborn et al.

[11] Patent Number: 4,482,374
[45] Date of Patent: Nov. 13, 1984

[54] PRODUCTION OF ELECTRICALLY CONDUCTIVE METAL FLAKE

[75] Inventors: Donald H. Osborn, Suffern; Richard J. Basley, Stony Point, both of N.Y.

[73] Assignee: MPD Technology Corporation, Wyckoff, N.J.

[21] Appl. No.: 386,051

[22] Filed: Jun. 7, 1982

[51] Int. Cl.$^3$ ............................................. B22F 9/08
[52] U.S. Cl. ................................. 75/0.5 R; 241/15; 241/17; 75/251; 148/126.
[58] Field of Search .............. 241/15, 16, 17, 19, 241/20, 21; 75/0.5 R, 0.5 A, 0.5 AA, 251–254; 106/209; 252/32.5; 148/126

[56] References Cited

U.S. PATENT DOCUMENTS

| | | | |
|---|---|---|---|
| 2,002,891 | 5/1935 | Hall | 106/290 |
| 3,181,962 | 5/1965 | Rolles | 106/290 |
| 3,244,542 | 4/1966 | Brown et al. | 106/277 |
| 3,709,439 | 1/1973 | Tundermann et al. | 241/15 |
| 3,776,473 | 12/1973 | Casey et al. | 241/15 |
| 3,901,688 | 8/1975 | Casey et al. | 75/0.5 R |
| 3,941,584 | 3/1976 | Tundermann et al. | 75/0.5 R |
| 3,963,482 | 6/1976 | Kondis | 75/0.5 R |
| 3,988,146 | 10/1976 | Kondis | 75/0.5 A |
| 3,995,815 | 12/1976 | Megelas | 241/15 |
| 4,065,060 | 12/1977 | Booz | 241/16 |
| 4,089,676 | 5/1978 | Grundy | 75/0.5 AA |
| 4,115,107 | 9/1978 | Booz et al. | 75/0.5 R |
| 4,172,720 | 10/1979 | Megelas | 75/251 |
| 4,186,244 | 1/1980 | Deffeyes et al. | 428/570 |
| 4,273,583 | 6/1981 | Tyran | 75/251 |
| 4,289,534 | 9/1981 | Deffeyes et al. | 106/1.14 |
| 4,305,847 | 12/1981 | Stoetzer et al. | 252/512 |
| 4,318,747 | 3/1982 | Ishijima et al. | 106/290 |
| 4,382,981 | 5/1983 | Stoetzer et al. | 427/105 |

OTHER PUBLICATIONS

S. J. Monte and G. Sugarman, "A New Generation of Age and Water Resistant Reinforced Plastics", 34th Annual Tech. Conf., Reinforced Plastics/Composites Inst., The Soc. of the Plastics Ind., Inc., Sec. 16-E, pp. 1–11, 1979.
Handbook of Ball Mill and Pebble Mill Operation, Paul O. Abbe Incorporated, Little Falls, NJ.
Reference Manual Supplement—1981, Reprinted from Modern Plastics, Aug. 1981.

Primary Examiner—L. Dewayne Rutledge
Assistant Examiner—Christopher W. Brody
Attorney, Agent, or Firm—Raymond J. Kenny; Miriam W. Leff

[57] ABSTRACT

Metal flake of improved conductivity is produced by a method comprising wet ball milling a powder of a conductive metal in the presence of a lubricant comprising an organometallic compound.

25 Claims, No Drawings

PRODUCTION OF ELECTRICALLY CONDUCTIVE METAL FLAKE

TECHNICAL FIELD

The present invention relates to conductive metal flake and a process for producing such flake. More particularly, it relates to electrically conductive nickel flake.

BACKGROUND OF THE INVENTION

There is a demand for highly conductive metal flake for applications such as electronic shielding and circuitry, and for pigments, e.g. for water-based paints, inks, etc. One technique for producing metal flake involves a wet milling technique in which metal powder is ball milled in a low viscosity liquid, referred to herewith as a mobile liquid, the liquid eventually being driven off, e.g. by centrifuging and vacuum drying. The liquid is recovered and if in satisfactory form therefor it is reused. It is also known to incorporate a small amount of a lubricant such as fatty acids in the liquid medium to minimize or prevent welding of the particles being milled. U.S. Pat. Nos. 3,709,439 and 3,941,584, for example, disclose a method of making stain-resistant metals and alloys including nickel, which have smooth, specularly reflective surfaces, are bright and lustrous and are characterized by aesthetic effectiveness in paint films and other applications. However, the flake produced by the described method is essentially non-conductive or poorly conductive. A further problem in the milling process is the degeneration of the liquid medium which limits the re-use and adds to the cost of processing.

It is believed that the impaired conductivity of the nickel flake is caused by residual fatty acid lubricant or metallic soaps left on the flake after drying, and it has been found that when subjected after drying to annealing in a reducing atmosphere the flake can be made conductive, possibly by removing sufficient amounts of the residual lubricant. However, the temperatures required to make the flake conductive are too high, and result in sintering or agglomeration of the flake, thus destroying its usefulness. Lower temperatures at which sintering or agglomeration is prevented are not effective from the standpoint of conductivity.

It has been found that with the use of a suitable lubricant in the mobile liquid system as a substitute for fatty acid lubricants, conductive metal flake can be obtained, and it can be obtained in the dried condition without the need for an anneal step after the milling process. However, conductivity can be further improved by an annealing step. If an annealing cycle is used, it can be carried out at temperatures which do not present a sintering problem. Further, annealed flake can be made which has good environmental stability, e.g., decreased loss of conductivity due to exposure to moisture and/or elevated temperatures.

With respect to the processing operation, it has been found that with the lubricant of this invention, the deterioration of the liquid medium is, at least, reduced considerably, and the flake is produced with high production efficiency and reproducibility.

These and other advantages of the present invention will become apparent from the description which follows taken in consideration with the examples. In this connection, it is noted that although the present invention is described herein with particular reference to nickel, the same principles apply to other conductive metals and alloys, as will be evident to those skilled in the art.

THE INVENTION

In accordance with the present invention metal flake with improved conductivity is produced by a method comprising wet ball milling a powder of a conductive metal in a mobile liquid system containing a small amount of lubricant, said lubricant having dispersant properties and comprising an organometallic compound, said organometallic compound being at least partially soluble in the mobile liquid system and being decomposable below the sintering temperature of the conductive metal flake. In an advantageous embodiment the organometallic compound serves also as a dispersing agent which minimizes welding of the metal particles as well as the agent which improves conductivity. In a preferred embodiment, the organometallic compound serves as the dispersant as well as the agent to improve conductivity, and the lubricant suitable for this dual purpose comprises an organometallic substituted alcohol. Preferred organometallic compounds are titanates, e.g., isopropyl tri(dioctylpyrophosphato) titanate.

It is not known exactly how the organometallic compound of this invention serves to increase the conductivity of the flake. However, it is believed that in addition to the organic component of the organometallic compound being readily removed from the flake, the organometallic compound deposits a nonhydrated metallic oxide on the surface of the flake on which a monolayer of the oxide of the conductive metal develops or has developed. The combined deposit of the metal oxide of the organometallic and monolayer of nonhydrated metal oxide developed during the milling operation form either a more stable oxide monolayer on the flake or a ceramic semiconductive mixed metal oxide. Subsequent treatment of the flake in a reducing atmosphere may aid in developing a suitable oxide. It is also possible that the organometallic component of the lubricant changes the morphology of the flake in a way which will enhance the conductivity.

In one aspect of the present invention, the conductivity of the flake is enhanced by subjecting the flake to an annealing cycle in a reducing atmosphere at a temperature below the sintering temperature of the flake. In general, if an annealing treatment is applied to flake produced with fatty acid lubricants, higher annealing temperatures and longer annealing times are required than for flake produced with an organometallic compound of this invention. Because the temperature must be below the sintering temperature of the flake, the conductivity of flake produced with fatty acid lubricants is not significantly enhanced. The use of an organometallic compound as a lubricant allows a substantial reduction in the annealing cycle requirements, thereby reducing the risk of agglomeration. It has been found, for example, that nickel flake can be produced which in the annealed condition has a specific resistivity of less than 1 ohm/sq, and even less than 0.5 ohm/sq, e.g., about 0.2 or less ohm/sq.

DETAILED DESCRIPTION OF THE INVENTION

1. Milling to Conductive Flake

The milling environment consists of the powder charge, the mobile liquid, the lubricant and the ball charge.

As noted above, the key feature of the present invention is the lubricant which is maintained in a small concentration in the mobile liquid environment in the mill during the milling step. In general, conventional lubricants have dispersant properties so as to minimize welding of the metal particles. Suitable lubricants in accordance with this invention comprise an organometallic compound, preferably a substituted alcohol, the organometallic compound being at least partially soluble in the mobile liquid environment and decomposable below the sintering temperature of the metal flake. In an advantageous embodiment the organometallic compound also serves as the dispersant. Preferably the compound is an organometallic having in the metal moiety comprising at least one metal selected from a group of elements which has a different valence from the conductive metal being produced in the flake form. Exemplary of the metals contained in the metallic moiety are titanium, zirconium, tantalum, silicon, hafnium, vanadium, lithium, tin and lead. Exemplary of the organometallics is isopropyl tri(dioctylpyrophosphato) titanate.

It is noted that the organometallic titanates have been used as coupling agents for polymers. It has been found, however, that the above-mentioned titanates can be used effectively in the wet milling medium to enhance the conductivity of conductive metal flake.

The lubricant is present in the mill charge during milling in a small concentration, e.g. about 0.25% or less, e.g. 0.1% or even lower up to about 2, or 5 or 10% by weight of the metal charge. Preferably it is present in an amount of less than 1%. The least amount of lubricant should be used consistent with the desired properties, in keeping with the desire to avoid unnecessary build-up of lubricant coating on the flake. The actual amount of the lubricant required to be effective may be dependent, for example, upon the specific lubricant and the particular metal being milled. It is advantageous to make small periodic additions of lubricant during the mill run if necessary to replace that which is consumed by coating the flakes as they are formed and that which is lost during the operation.

It has been found, for example with respect to the use of an organometallic titanate, which may serve the dual function in the lubricant, that it is not readily degraded, despite the heat generated in the mill, which is an advantage over fatty acids previously used. However, it is preferable that the mill be cooled during operation as by employing a water jacket about or water spraying the outside of the mill.

It is essential in accordance with the invention that the milling action be conducted in a mobile liquid medium. Satisfactory mobile condition of the liquid medium is evidenced when the mill is discharged as by pouring out the entire contents of a ball mill, or removing one or more balls from the mill, and it is found that there is little or no coating of the balls by the powder charge. The mobile liquid is preferably mineral spirits (light liquid hydrocarbons usually having a specific gravity in the range of about 0.7 to 0.9), but may be water, isopropanol, naphtha, or other liquid of relatively low viscosity which may readily be removed from the flake product. Mixtures of mobile liquids may be employed. The liquid should wet the powder and the balls. In general, the mobile liquid is used in an amount to at least cover the balls. Typically, the mobile liquid and ball charge will occupy about 60% by volume of the mill, the liquid being about 5 cm (2 in) above the ball charge.

The metals to which the present invention applies are conductive metals and alloys. The metals may be, e.g., selected from Groups IB, VIB, IIIA and VIII of the Periodic Table. Exemplary of the metals are nickel, copper, cobalt, aluminum, chromium, silver, gold, platinum group metals, and conductive alloys thereof. Examples of conductive alloys that can be produced in accordance with this invention are: Fe-Ni-Ag and Ni-Cu-Zn (e.g. nickel silver), Cu-Zn (e.g., brass), Cu-Sn (e.g., bronze) alloys.

The initial powders can be made by any technique used to make metal powders, and they preferably are as free as possible of oxides and other contaminants as such material can produce undesirable effects in ultimate applications, e.g., in paint films, if not removed, and the metal and alloy powders should be as low as possible in the content of impurities which detrimentally affect malleability, e.g., sulfur, nitrogen, phosphorous, carbon, etc. In some alloys excessive amounts of silicon and/or manganese can detrimentally affect malleability.

Carbonyl nickel powder having an average particle size of about 2 to 7 $\mu$m and very low in impurity content is an ideal starting material for conversion to flake in accordance with the invention.

In carrying out the process of the invention, the starting material will normally be a metal powder usually having a fine particle size, for example, a size such as to pass a 100 mesh Tyler screen having openings measuring about 147 $\mu$m, preferably having a size such as to pass a 325 mesh Tyler screen (openings measuring 44 $\mu$m). In converting such powders to flake having aesthetic characteristics, individual powder particles are flattened between impacting grinding balls or between the balls and the wall of the container holding them. In general, it is more important to have small particle size initially with softer powders (compared to nickel), e.g. aluminum or silver powders. Some comminution of the powder results, and with coarser starting powders, more comminution is necessary to provide a flake product having the thinness, e.g., an average thickness less than about 1 $\mu$m, required for aesthetic uses, and to permit suspension in a liquid medium such as a paint.

The flake product provided in accordance with the invention are generally used in coating products. It is often desirable to apply the coating with a spray gun and it is important for the flake to be of such a size that it does not clog the spray gun. To satisfy this requirement the flake product will contain a major proportion of particles having an average thickness less than 1 $\mu$m and preferably less than about 0.75 $\mu$m or less than about 0.5 $\mu$m, with an average dimension across a major flake axis of about 10 to about 80 $\mu$m, e.g., about 20 to about 40 $\mu$m. For special purposes, such as for use in plastics, etc., larger flakes may be desirable and can be achieved in accordance with the invention. Thus, flake products containing a major proportion of particles having an average dimension across a major flake axis exceeding 44 to 50 $\mu$m and up to, e.g., 150 $\mu$m, can be produced. For such products, it is preferred to start with metal or alloy powders in the size range passing 100 mesh but retained on a 325 mesh screen. Such larger flake products may be several $\mu$m, e.g., up to 3 $\mu$m, thick, since such products are intended for use in media which will accept heavier particles.

To obtain flake with suitable morphology for good conductivity as well as improved reflectivity, milling of the metal powder in the mobile liquid medium in the presence of a group of milling or grinding bodies confined in a milling space should be carried with the volume ratio of said liquid medium to said metal powder being at least about 10:1, and more preferably at least about 20:1, or even at least about 25:1, e.g., about 25:1 to about 50:1, and with said liquid medium being present in relation to the volume of said milling or grinding bodies such that the interstitial space between said grinding bodies at rest in the confined milling space in substantially completely filled with said liquid medium. Lower liquid to powder ratios may be employed but the risk of producing roughened surfaces of lower specular brightness on the flake product is thereby increased. Higher liquid to powder ratios may be employed but production rate is thereby lowered, which is undesirable economically, and other detrimental effects may be encountered. In general, the processing can be carried out at a wide range of grinding bodies to powder ratio.

As noted in the aforementioned U.S. Patents, the milling can be conducted in a conventional ball mill or in an attritor mill or in other types of grinding or milling equipment, e.g., vibratory and planetary ball mills, and the term "ball mill" is used generically herein to include mills wherein a charge of grinding balls or otherwise shaped grinding media is confined in a container therefor. While the milling action itself can vary depending upon the particular equipment involved, nevertheless the teachings herein are applicable and enable the production of satisfactory flake products from conductive metals.

THE CONVENTIONAL BALL MILL

For practical purposes, the conventional ball mill forms a convenient apparatus in relation to the present invention. As is known, the mill comprises a hollow cylindrical container or shell in which a charge of grinding balls, preferably substantially uniform in size and preferably substantially spherical in shape is placed. Usually the volume of the ball charge including the free space therebetween will occupy less than half of the volume of the mill, and when at rest the mobile liquid will at least cover the balls. The mill is rotated about its cylindrical axis at a rotational speed sufficient to create a cascading and impacting or impinging action in the ball charge. It is desirable to provide a number of lifters fastened to the inner cylindrical wall parallel to the cylindrical axis and extending along the length of the mill so as to reduce slippage of the ball charge against the inner cylindrical mill wall. The effective impacting action of the balls which produces flake occurs in only a limited zone, i.e., the charge zone within which the cascading action of the balls occurs. As the balls are lifted due to rotation of the mill, the mobile liquid is believed to drain therefrom so that most of the liquid and most of the powder being acted upon remains in the lower portion of the mill and is available in the active zone.

THE ATTRITOR MILL (STIRRED BALL MILL)

This mill is considered to be substantially more active in relation to grinding than the ball mill. The mill comprises an axially vertical stationary cylinder having a rotatable agitator shaft located coaxially of the mill with spaced agitator arms extending substantially horizontally from the shaft. The mill is filled with grinding elements, preferably metal, e.g., steel balls, usually of substantially uniform size, sufficient to bury at least some of the horizontal arms so that, when the agitator shaft is rotated, the ball charge, by virtue of the arms passing through it, is maintained in a continual state of unrest or relative motion through the bulk thereof during milling. In operating the attritor mill in accordance with the invention the mill tank is filled with balls to about one or two ball diameters in height above the topmost horizontal agitator arm and the entire free space within the ball charge is filled with the mobile liquid such that the liquid covers the top of the ball charge at rest. The entire ball charge within the attritor mill is considered to be active due to the motion of the agitator arms therethrough when the mill is in operation.

PROCESSING OF THE FLAKE

The flake after discharge from the mill is separated from the liquid by any technique used for liquid/solid separation. It may be used as a paste or dried. In accordance with one aspect of the present invention the flake may also be subjected to an annealing treatment which includes treatment in a reducing atmosphere at a temperature below the sintering temperature of the metal.

The drying treatment, as distinguished from the anneal, is mainly to remove the mobile liquid. Drying may be carried out in a drying oven, e.g., at about 90° C. for the period of time required to remove all or substantially all of the mobile liquid. This is referred to in the examples below as the "as-dried" condition. On a commercial scale a more practical approach for drying is treatment under a slight vacuum at a more elevated temperature, e.g., in the range of about 80° C. to 200° C. ($\sim$180° F. to 400° F.), e.g., about 150° C. (300° F.) and cooling under vacuum. A reducing purge may be included, e.g., before or during cooling.

The annealing treatment comprises treatment in a reducing atmosphere at a temperature below the sintering temperature of the metal flake. A hydrogen containing stream, e.g., 95%$N_2$-5%$H_2$, has been found satisfactory. The metal flake can be brought to temperature in a vacuum and cooled under vacuum. For example, it has been found that when using the lubricant of the present invention, the electrical conductivity of nickel flake can be enhanced by annealing treatment in a 95%$N_2$-5%$H_2$ stream at an elevated temperature e.g., in the range of about 120° to 315° C. (250-600° F.), e.g., about 230° C. (450° F.). It is noted that while the stability of the flake can be improved with the anneal, it may be with some sacrifice in reflectivity.

The following examples are given in order to give those skilled in the art a better appreciation of the advantages of the invention. In the examples the main tests carried out are electrical conductivity, particle size and specular reflectance. Electrical conductivity is evaluated in tests for surface resistance. Surface resistance (or more technically, the resistivity) of a conductive paint is measured in ohms per square. Ohms per square is a nondimensional measurement which is derived from ohms law and specific resistant equations, and as such is independent of the area of the probes, provided the distance between the probes is equal to the size of the probes. The preferred level for surface resistance is 1 ohm per square or less. The conductive flake is mixed in a carrier paint system, applied as a uniform layer to a glass microscope slide or a structural foam plastic substrate and dried. Surface resistance is determined by placing a set of flat probes, having equal surface areas, in contact with the surface of the dried conductive coating and recording the resistance with an ohmmeter. The distance between the probes is such that the surface area between the probes is equal to the area of each probe (e.g., probes 1" square would have exactly 1" between the edges of the probes). The surface resistance is independent of the area of the conductor, as long as the length and width are equal. The test is nonstandard, but is comparative. Specular reflectance is determined on dried flake. Specular reflectance is determined by a test comprising forming a water-floated layer of the flake sample to be measured, aiming a light beam of parallel rays, at an angle of 30° from the vertical, generated by a tungsten filament light source and measuring the specularly reflected light ($R_s$) from the beam by means of photocell sensitive in the range of 300 to 700 μm wavelength. The test is nonstandard, but is comparative. It is affected to an extent by the absorption characteristics of the material tested and the photocell can report light values at wavelengths which are outside the visible spectrum. The test forms a useful indication of the surface smoothness of metal flake.

EXAMPLE I

This example shows the effect of milling time in a process carried out in accordance with the present invention.

In this example, a ball mill is employed which is approximately 91.5 cm (36 in) in diameter, 30.5 cm (12 in) long and is provided with 15 internal lifters about 3.8 cm wide×2.5 cm high (1½ in wide×1 in high) fastened at 24° spacings over the full cylindrical face of the mill parallel to the cylindrical axis. The mill is charged with 272.2 kilograms (600 lbs) of 0.64 cm (¼ in) diameter steel balls, 7.7 kilograms (17 lbs) of carbonyl nickel powder of about 2.2 to about 3 μm average size, 34.1 liters (9 gallons) of 66/3 mineral spirits (a light liquid hydrocarbon mineral spirits similar in viscosity to kerosene and having a specific gravity of about 0.771), and 18.2 grams of isopropyl tri(dioctylpyrophosphato) titanate. The ball to liquid volume ratio is 1.02:1, the ball to powder volume ratio is 40:1 and the liquid to powder volume ratio is 39.3:1. The mill is rotated at 27 rpm. Samples are taken at various milling periods from ½ to 2 hours. Each sample is discharged, and following a liquid/solid separation the flake is dried at 149° C. (300° F.) using a vacuum of 30 in. of mercury, then flushed with a 95%N$_2$-5%H$_2$ stream for 30 minutes and allowed to cool under vacuum. Average thickness(T), particle size and specular reflectance ($R_s$) of the flake were determined. The flake is bright and lustrous and the product produced in a milling time of 1.5 hours, for example, yielded 93.7% by weight finer than 44 μm in size.

Samples of the dried flake from each run are subjected to an "anneal" treatment which consists of permitting the temperature to rise to 230° C. (450° F.) under vacuum, then under a 95%N$_2$-5%H$_2$ gas stream at 230° C. for one hour, followed by cooling under vacuum. Surface resistivity of annealed samples is determined.

Typical data obtained on thickness and specular reflectance and surface resistivity are shown in TABLE I.

TABLE I

| Milling Time hrs | Size - μm* | | | T** μm | $R_S$** % | Surface*** Resistivity ohms/sq. |
|---|---|---|---|---|---|---|
| | −44 | −61 +44 Wt. % | +61 | | | |
| 0.5 | 96.7 | 1.4 | 1.9 | 1.25 | 26.3 | 0.15 |
| 1.0 | 95.1 | 3.6 | 1.3 | 1.0 | 30.2 | >0.15−<0.2 |
| 1.5 | 93.7 | 5.6 | 0.7 | 0.8 | 39.3 | 0.2 |
| 2.0 | 95.0 | 4.5 | 0.5 | 0.67 | 42.7 | 0.2 |

*Determined by a dry screening technique.
**Determined on product screened through a screen having 44 μm openings.
***Determined on flake in the "annealed" condition.

The results in Table I show the effect of milling time on various properties and show flake was produced with a surface resistivity of less than 1 ohm/sq. For example, at a milling time of about 1 hour, the resistivity was between about 0.15 and about 0.2 ohm/sq. (It is noted that accuracy of the ohmmeter used is about 0.2 ohm.) While reflectivity increased with time, resistivity also increased slightly and thickness of the flake decreased.

EXAMPLE II

This example shows the environmental effect on nickel flake produced and treated in accordance with the present invention.

Nickel flake produced using essentially the same method as shown in Example I, except that samples milled for the 0.5, 1.0, 1.5 and 2.0 hour periods are subjected to an accelerated environmental test. The test consists of subjecting samples prepared in the annealed condition for resistivity test, as described above, to steam for 2 hours and permitting them to dry in air.

Surface resistivity data on the samples are shown in Table II

TABLE II

| Mill Time hrs | Surface Resistivity ohms/sq. |
|---|---|
| 0.5 | <0.3 |
| 1.0 | <0.3 |
| 1.5 | 0.38 |
| 2.0 | 0.38 |

A comparison of the resistivity data in Tables I and II show that resistivity was slightly higher. However, all samples still show a surface resistivity below 1 ohm/sq, and even below 0.5 ohm/sq.

EXAMPLE III

The purpose of this example is to show the effect of the lubricant on the conductivity of flake produced in a wet milling process.

Samples of nickel flake are produced using essentially the same processing conditions as described in Example I, except that three different lubricants are used, viz. oleic acid (A), cetyl alcohol (B) and isopropyl tri(dioctylpyrophosphato) titanate (C). Samples were examined "as-dried" (for one hour in a vacuum oven) to remove mineral spirits. Typical average thickness (T), specular reflectance (Rs), particle size and resistivity data are shown in Table III, which also shows the specific lubricant used for each sample.

TABLE III

| Lubricant | Milling Time Min. | Size - μm | | | T μm | $R_s$ % | Surface Resistivity ohms/sq. |
|---|---|---|---|---|---|---|---|
| | | −44 | −61 +44 Wt. % | +61 | | | |
| A | 50−70 | 99.8 | 0.2 | 0.0 | 1.6 | 27.5 | 1.8 |

TABLE III-continued

| Lubricant | Milling Time Min. | Size - μm -44 Wt. % | -61 +44 Wt. % | +61 Wt. % | T μm | $R_s$ % | Surface Resistivity ohms/sq. |
|---|---|---|---|---|---|---|---|
| B | 60 | 98.1 | 1.7 | 0.2 | 1.1 | 25.7 | 1.5 |
| C | 60 | 95.1 | 3.6 | 1.3 | 1.0 | 30.2 | 0.6 |

The results in Table III show that in the as-dried condition there is considerable improvement in conductivity for samples prepared with the cetyl alcohol and the titanate, both being under 1 ohm/square. Samples prepared with the titanate in accordance with this invention, however, could be further and markedly improved with respect to conductivity over samples prepared with the cetyl alcohol lubricant by a further treatment as shown in EXAMPLE IV.

EXAMPLE IV

The purpose of this example is to demonstrate the effect on resistivity of an annealing step and to compare annealing requirements for flake prepared with various lubricants. This example also shows the results of a sink test on the samples after anneal.

Samples are prepared using essentially the same processing conditions to prepare flake as shown in Example I, but using the three different lubricants for each sample, respectively, as shown in Example III. Surface resistivity obtained in the "as-dried" treatment and in the annealed condition (ANNLD), and the annealing treatment required (ATR) to minimize surface resistivity are given in Table IV.

A sink test was performed on annealed samples as follows: A 70 mm diam × 50 mm high crystallizing dish was filled with 100 ml of distilled water. An 0.5 sample of annealed flake was spread on the surface of the water and it was observed whether the flake would sink and whether sinking was delayed or immediate and whether the effect was complete. The observations are reported in TABLE IV.

TABLE IV

| Lubricant | Milling Time Min. | Surface Resistivity (ohm/sq) As-Dried | ANNLD | ATR | Sinking Behavior in H₂O (Annealed) |
|---|---|---|---|---|---|
| A | 50-70 | 1.8 | 0.8 | D | delayed - heavy surface residual & rolling |
| B | 60 | 1.5 | 0.2-0.6 | D | delayed - heavy surface residual & rolling |
| C | 60 | 0.6 | 0.15-0.2 | E | immediate & complete |

D = At 315° C. (600° F.) for approx. 5 hrs in 95% $N_2$-5% $H_2$/cooled in 95% $N_2$-5% $H_2$.
E = Heated to 230° C. (450° F.) under vacuum/1 hr in 95% $N_2$-5% $H_2$/cooled under vaccum.

The data in TABLE IV show a marked improvement in conductivity of the flake prepared with the titanate lubricant of the present invention and that the annealing requirements to obtain such improvement were markedly less severe than for the samples prepared with oleic acid or cetyl alcohol.

The results of the sink test matched the resistivity tests. That is, the samples of flake prepared with titanate were observed to sink immediately and completely. It is believed that immediate sinking denotes virtually total removal of the residual lubricants and that delayed sinking with heavy surface residuals indicates retained lubricant in the flake. This may be at least in part responsible for the improved conductivity of the flake prepared in accordance with the present invention.

The yields of flake prepared with oleic acid and cetyl alcohol, respectively, and annealed essentially under required conditions D of TABLE IV are poor and generally less than 50%, e.g., about 30%. The poor yield can be attributed to balling and agglomeration of the flake. Flake prepared with a titanate lubricant and annealed essentially under required conditions E of TABLE IV can be produced in yields of no less than 95% or even as high as 98-99%.

EXAMPLE V

The purpose of this example is to show the effect of various annealing atmospheres on the surface resistivity of nickel flake prepared with a titanate lubricant of this invention.

Samples of nickel flake produced using essentially the same processing conditions as described in EXAMPLE I and milled for 1 hour are tested for surface resistivity in the "as-dried" condition and after further treatment under various atmospheres at an elevated temperature for 15 minutes. Cooling was generally for a short period of time under the atmosphere of treatment. Typical results are shown in TABLE V.

TABLE V

| Atmosphere | Temp. °C. | Surface Resistivity ohms/sq. |
|---|---|---|
| As-Dried | 90 | 0.6 |
| Argon | 315 | 0.8 |
| Vacuum | 150 | 0.6 |
| 95% $N_2$-5% $H_2$ | 315 | 0.2 |

The results in TABLE V show the marked improvement produced by a reducing atmosphere during anneal. However, it is noted that all samples show a surface resistance of less than 1 ohm/sq.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A process for producing metal flake having improved conductivity comprising wet ball milling a powder of a conductive metal in a mobile liquid system containing a small amount of lubricant to produce a conductive metal flake, said conductive metal being selected from the group consisting of nickel, copper, cobalt, aluminum, chromium, gold, platinum group metals and conductive alloys thereof, said lubricant comprising an organometallic substituted alcohol, and said organometallic alcohol being at least partially soluble in the mobile liquid system and being decomposable below the sintering temperature of the conductive metal flake.

2. A process according to claim 1, wherein the conductive metal is selected from the group consisting of nickel, copper and conductive alloys thereof.

3. A process according to claim 1, wherein the metal containing moiety of the organometallic substituted alcohol comprises at least one metal selected from an element having a different valence from the valence of the conductive metal.

4. A process according to claim 1, wherein the metal containing moiety of the organometallic substituted alcohol comprises at least one of the metals selected from the group consisting of titanium, zirconium, hafnium, tantalum, vanadium, silicon, lithium, tin and lead.

5. A process according to claim 1, wherein the metal containing moiety of the organometallic substituted alcohol comprises titanium.

6. A process according to claim 1, wherein the lubricant is an organometallic substituted alcohol.

7. A process according to claim 1, wherein the organometallic substituted alcohol is a titanate.

8. A process according to claim 1, wherein the lubricant is isopropyl tri (dioctylpyrophosphato) titanate.

9. A process according to claim 1, wherein the lubricant is present in an amount of about 0.1% to about 10%.

10. A process according to claim 1, wherein the metal flake produced by wet ball milling is dried by a method which comprises subjecting the flake to a temperature in the range of about 80° C. to 200° C. under a vacuum until the mobile liquid is removed.

11. A process according to claim 10, wherein after drying the metal flake is treated in a reducing atmosphere.

12. A process according to claim 1, wherein the mobile liquid system comprises mineral spirits and the metal flake produced by wet ball milling is dried to remove mineral spirits and then subjected to an annealing treatment comprising subjecting the flake to a reducing atmosphere at a temperature below the sintering temperature of the flake.

13. A process according to claim 12, wherein the reducing gas comprises hydrogen.

14. A process according to claim 1, wherein the conductive flake is nickel, the lubricant is an organometallic titanate, and the reducing atmosphere comprises hydrogen.

15. A process according to claim 1, wherein said mobile liquid system comprises an organic liquid having low viscosity and being readily removable from the flake.

16. A process according to claim 1, wherein said lubricant comprises isopropyl tri (dioctylpyrophosphato) titanate.

17. A process for producing a metal flake having improved conductivity comprising wet ball milling a conductive metal powder in a mobile liquid system containing a small amount of lubricant to produce a metal flake, said conductive metal being selected from the group consisting of nickel, copper and conductive alloys thereof, said mobile liquid system comprising an organic liquid having low viscosity and being readily removable from the flake, said lubricant comprising an organometallic substituted alcohol, and said organometallic alcohol being a least partially soluble in the mobile liquid system and being decomposable below the sintering temperature of the conductive metal flake, drying the metal flake to remove the mobile liquid system, and then treating the dried flake to a reducing atmosphere at a temperature below the sintering temperature at said metal flake.

18. A process according to claim 17, wherein the drying is carried out at a temperature in the range of about 80° C. to about 200° C. under a vacuum and then cooled under a vacuum, and wherein the reducing atmosphere comprises hydrogen.

19. A process according to claim 17, wherein the treatment in a reducing atmosphere comprises subjecting the dried flake to a reducing atmosphere comprising hydrogen at a temperature in the range of about 120° C. to about 300° C.

20. A process according to claim 17, wherein the reducing atmosphere is a gas stream composed of about 95% $N_2$-5% $H_2$.

21. A process for producing metal flake having improved conductivity comprising wet ball milling powder of a conductive metal in a mobile liquid system containing a small amount of lubricant comprising an organometallic substituted alcohol to produce a conductive metal flake, the conductive metal being selected from the group consisting of nickel, copper, cobalt, aluminum, chromium, gold, platinum group metals and conductive alloys thereof to produce a metal flake, drying the metal flake and then treating the dried metal flake in a reducing atmosphere below the sintering temperature of such metal flake.

22. A process according to claim 21, wherein the drying is carried out at a temperature in the range of about 80° C. to about 200° C. under a vacuum and then cooled under a vacuum, and wherein the reducing atmosphere comprises hydrogen.

23. A process according to claim 21, wherein the treatment in a reducing atmosphere comprises subjecting the dried flake to a reducing atmosphere comprising hydrogen at a temperature in the range of about 120° C. to about 300° C.

24. A process according to claim 21, wherein the reducing atmosphere is a gas stream composed of about 95% $N_2$-5% $H_2$.

25. A process for producing metal flake having improved conductivity comprising wet ball milling a powder of a conductive metal in a mobile liquid system containing a small amount of lubricant, to produce a conductive metal flake, said conductive metal being selected from the group consisting of nickel, copper, cobalt, aluminum, chromium, gold, platinum group metals and conductive alloys thereof, said mobile liquid system comprising an organic liquid having low viscosity and being readily removable from the flake and said lubricant comprising isopropyl tri (dioctylpyrophosphato) titanate.

* * * * *